United States Patent Office 2,826,567
Patented Mar. 11, 1958

2,826,567

POLYMERIC COMPOSITIONS

Herman A. Bruson, North Haven, Conn., assignor to Industrial Rayon Corporation, Cleveland, Ohio, a corporation of Delaware No Drawing. Application April 21, 1954
Serial No. 424,784

21 Claims. (Cl. 260—85.5)

This invention relates to new acrylonitrile polymer compositions and to shaped articles of such materials such as, for example, fibers, films, and the like, having an improved affinity for dyes, notably acid dyes. More particularly, it relates to dye-receptive acrylonitrile polymer materials which are the reaction products of certain acrylonitrile-halohydrin copolymers with certain organic amines.

The new polymeric compositions of the present invention comprise the reaction product of an organic amine having at least one hydrogen atom attached to an amino nitrogen atom and having an ionization constant greater than aniline, with an acrylonitrile-halohydrin copolymer comprising the polymerization product of a mixture comprising acrylonitrile and a 1,2-halohydrin having the formula $$\begin{array}{c} R \\ | \\ CH_2=C-Y \end{array}$$

wherein "R" is a member of the group consisting of hydrogen, a methyl radical, chlorine, bromine and iodine; and "Y" is a member of the group consisting of —CH$_2$OH and

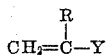

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine. The percentage of acrylonitrile in the polymer molecule is at least about 40% by weight and preferably at least about 80% by weight, and the percentage of the halohydrin in the polymer molecule before reacting with the amine is at least about 0.5% by weight and preferably between about 2% and 15% by weight.

Particular advantages are derived when "R" is a hydrogen and especially when both "R" and "R$_1$" are hydrogen.

In the production of oriented fibers, the acrylonitrile-halohydrin copolymers should be reacted with the amine subsequent to the formation of the oriented fiber products.

The acrylonitrile-halohydrin copolymers of this invention, i. e., before reaction with the amine, are believed to comprise in the polymer molecule randomly repeating units having the formulae

wherein "R," "R$_1$," and "Y" are as defined above.

It is believed that the organic amine reacts with the acrylonitrile-halohydrin polymer product, e. g., fibers, by replacing one or more of the halogen atoms present in the copolymer chain by organic substituted amino groups.

The amine-containing polymer fibers are believed to comprise in the polymer molecule randomly repeating units having formulae such as, for example, the following:

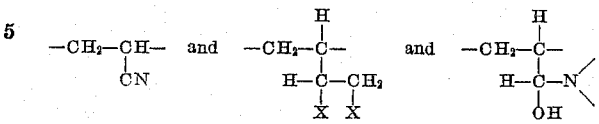

wherein "X" is as defined above and "N" is an amino nitrogen atom, the valences being satisfied to form a secondary or tertiary amine, e. g., two ethanol groups satisfying the valences to form a diethanolamine

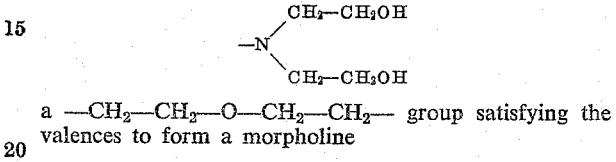

a —CH$_2$—CH$_2$—O—CH$_2$—CH$_2$— group satisfying the valences to form a morpholine

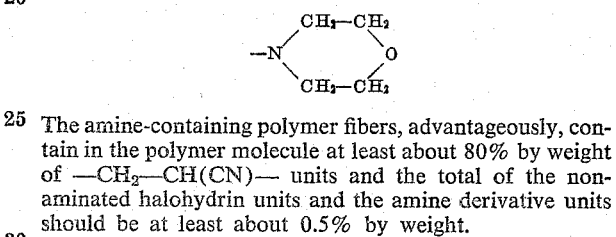

The amine-containing polymer fibers, advantageously, contain in the polymer molecule at least about 80% by weight of —CH$_2$—CH(CN)— units and the total of the non-aminated halohydrin units and the amine derivative units should be at least about 0.5% by weight.

Typical 1,2-halohydrins useful for the purpose of this invention are, for example, the following:

1-chloro-2-hydroxy-butene-3, CH$_2$=CH—CHOH—CH$_2$Cl
1-hydroxy-2-chloro-butene-3, CH$_2$=CH—CHCl—CH$_2$OH
1-hydroxy-2-chloropropene, CH$_2$=CCl—CH$_2$OH In place of the chlorohydrins set forth above, the corresponding bromo- or iodohydrins may be used. These halohydrins may be obtained from the corresponding chlorohydrins, if desired, by reaction with alkali metal bromides or iodides.

The acrylonitrile-halohydrin copolymer may be formed into fibers by extruding solutions of these copolymers into suitable coagulating media, e. g. evaporative atmospheres or liquid coagulating baths. The fibers produced in this manner may then be treated to remove the residual solvent, and thereafter, stretched and heat treated so as to produce oriented fibers having high tenacity, high elastic recovery, low shrinkage, etc.

The organic amines suitable for reaction with the above oriented fibers are the primary and secondary amines having ionization constants greater than aniline, i. e., ionization constants greater than $4.6 \times 10^{-10}$ at 25° C. These amines may be saturated or unsaturated amines and may be aliphatic, aromatic, arylaliphatic, cyclo-aliphatic, or heterocyclic in character and advantageously may possess more than one amino group.

Typical of the organic amines which can be used according to the present invention are the following:

Methyl, ethyl, propyl, isopropyl, n-butyl, sec-butyl, isobutyl, n-amyl, iso-amyl, sec-amyl, hexyl, heptyl, octyl, dodecyl, hexadecyl, octadecyl, dimethyl, diethyl, dipropyl, dibutyl, diisoamyl, 2-ethylhexyl, allyl, diallyl, and oleyl amines; ethanolamine, diethanolamine, cyclohexylamine, morpholine, piperidine, piperazine, dipropanolamine, 1,2-propanolamine, biguanide, guanidine, benzylamine, 3-dimethyl aminopropyl amine, 3 - isopropylaminopropyl amine, 3-methoxypropylamine, 3-isopropoxypropylamine, 4-amino-4-methyl-2-pentanol, and 2-aminopyridine.

Especially advantageous are the organic diamines or polyamines having two, three, four or more primary or secondary amino groups, e. g., ethylene diamine; diethylene triamine; triethylene tetramine; tetraethylene pentamine; 1,4-diamino-butane; 1,6-hexamethylene diamine; N-(aminoethyl) ethanolamine; N - morpholinoethylamine $H_2N-C_2H_4-NC_4H_8O$; bis - (beta-cyanoethyl) amine; $\beta,\beta'$ - diamino-diethyl ether; 1,2,3 - triaminopropane; and 1,3-diaminopropanol-2. The use of these polyamines not only increases the dye affinity of the oriented fibers, but also, if desired, may be employed to effect varying degrees of cross-linking between chains of the polymer molecule, resulting in a decrease in solubility in solvents which would otherwise dissolve the non-amino-containing fibers.

The dye affinity of the oriented fibers increases with an increase in the organic amine derivative content of the copolymer, and with the temperature and duration of the treatment with the amine, and with the concentration and basicity of the organic amino compound employed. As previously stated, the total of the halohydrin units and the amine derivative units should be at least 0.5% by weight. The optimum amount, consistent with a high quality yarn, will vary from one halohydrin compound to another, and in general, will lie between about 2% and 15% by weight.

The duration and temperature of the treatment of the oriented fibers with the amine will vary somewhat from one amine compound to another and will depend upon the basicity and reactivity of the amine employed. In general, a treatment temperature between about 80° to 100° C. for a period of five minutes to one hour with a 10% to 50% or more solution of the amine in water or an organic solvent, e. g., ethylene glycol, will be sufficient for most filaments and threads. However, a higher concentration of amine together with a longer treating period may be used if desired, e. g., treating of heavier denier threads.

The treated fibers, after washing out of the amine, are then subjected to the usual dyeing treatment with acid-type dyestuffs in an aqueous acidic bath, e. g., a 1% solution of the acid dyestuff containing about 2% to 5% sulfuric acid.

It is known that the affinity for acid dyestuffs of fibers spun from homopolymers of acrylonitrile is extremely poor and that this affinity can be improved by copolymerizing acrylonitrile with a basic nitrogen comonomer such as a vinylpyridine. However, acrylonitrile polymers containing basic nitrogen comonomers tend to discolor during the extrusion into fibers as the result of the heating of the spinning solutions, and generally, this discoloration increases in depth as the proportion of the basic nitrogen compound in the copolymer increases. The acrylonitrile-halohydrin copolymers, however, have a reduced tendency toward discoloration during extrusion and as a result, these new copolymers can be formed into fibers which are whiter than those made from copolymers containing relatively high (i. e., dye improving) proportions of a basic nitrogen compound. In addition, the white fibers formed, after reaction with the organic amines set forth above, can be dyed with acid dyestuffs to the same depth of shade or deeper than fibers formed from copolymers containing a basic nitrogen compound.

The unexpected nature of this invention is evidenced by the fact that other common halogen-containing polymers when similarly treated with an amine, do not exhibit the same advantages. Thus, the treatment with an amine of fibers comprising acrylonitrile and vinyl chloride, vinylidene chloride, allyl chloride or methallyl chloride, does not appreciably increase the dye affinity of such fibers. Such amine-treated fibers are only tinted when employing conditions under which the applicant's fibers are dyed to deep even shades.

This invention will be more fully described by the following examples, although it is understood that the invention is not intended to be limited by these examples. In these examples "percent" of materials is intended to mean percent by weight.

*Example I*

To a stirred solution of 1350 grams of distilled water and 4.8 grams of sodium formaldehyde sulfoxylate at 65° C., there was added a mixture of 190 grams of acrylonitrile and 10 grams of 1-hydroxy-2-chloropropene followed by a solution of 5.4 grams of potassium persulfate in 50 grams of water. Polymerization was continued at 61–64° C. for about 10 minutes after which an additional 2.7 grams of potassium persulfate in 100 grams of water was added to complete the polymerization at 62–64° C. for four hours. The yield of white powdery copolymer was 179 grams, having an average molecular weight of about 40,000, and containing 1.91% Cl by analysis. This corresponds to a 4.8% content of 1-hydroxy-2-chloropropene in the copolymer by weight.

It was readily soluble in N,N-dimethylformamide, ethylene carbonate, or N,N-dimethylacetamide to give spinnable solutions containing 20% solids by weight. It was not soluble in acetonitrile, acetone, or cyclohexanone.

A 20% solution of this copolymer in ethylene carbonate was extruded through a 40-hole spinneret (.003 inch diameter) into a coagulating bath of triethylene glycol maintained at about 120° C. The bundle of coagulated filaments was drawn through the bath for a distance of about 30 inches of bath travel and then collected on bobbins rotated at a peripheral speed of 40 meters per minute. The bobbins were then washed thoroughly with warm water. The washed yarn was subsequently stretched 10 times in length while heated to a temperature of about 145° C. and thereafter relaxed about 15% of its length at a temperature of about 140° C. to produce the final yarn. The yarn thus obtained (106 denier) designated (A), was very white and lustrous; possessing a tenacity of about 4 grams per denier and about 19.3% elongation at break. It was subjected to the following treatments:

(1) A skein of yarn (A) was boiled for thirty minutes in a 50% aqueous solution of diethylene triamine, then rinsed thoroughly with water. (A dried skein of this treated yarn showed about 4 grams per denier tenacity and about 21.3% elongation. It was no longer soluble in ethylene carbonate.) The yarn was then dyed at the boil for 30 minutes in the usual manner, with a 0.2% solution of Brilliant Croceine 3BA (an acid dyestuff) containing 0.2% sulfuric acid. It dyed an intense, brilliant level red which did not wash out upon repeated boiling with a 0.2% soap solution.

(2) A skein of yarn (A) was boiled for one hour with a 5% aqueous solution of Celliton Fast Red (an acetate dyestuff). The fabric became dyed a medium maroon shade which did not wash out on boiling with 0.5% soap solution.

(3) A skein of yarn (A) was boiled for thirty minutes with a 10% ethylene diamine solution, then rinsed with water and dyed at the boil with a 1% solution of Xylene Milling Blue BL containing 0.2% sulfuric acid. It dyed an intense shade of blue which did not wash out upon boiling with dilute soap solution.

A control sample of polyacrylonitrile yarn spun under the same conditions and of the same denier, but containing none of the 1,2-halohydrin grouping was dyed only very faintly under the same conditions shown in (1), (2) and (3) above.

A sample of yarn (A) was knitted into a tubular stocking. Samples of this knitted tubing were each boiled for 30 minutes in 15% aqueous solutions of the following amines:

Ethylene diamine, triethylene tetramine, diethylene triamine, piperamine, ethanolamine, piperidine, diethanolamine, N-(aminoethyl) ethanolamine, hexamethylene diamine, cyclohexylamine, N-morpholinoethyl amine, and N-dimethyl ethylene diamine. The fabrics were thoroughly rinsed with hot water and dyed at the boil for one hour with a 1% solution of the following acid dyestuffs, each containing 0.3% sulfuric acid.

Wool Orange 3G
Acid Brilliant Red 4BL
Acid Black 10BN
Fast Yellow YA
Acid Violet 4BNS
Orange Y
Acid Scarlet 2B
Brilliant Croceine 3BA Each sample dyed a deep brilliant hue which did not wash out with hot dilute soap solution.

In contrast to the above, a copolymer of acrylonitrile and vinylidene chloride containing 3.1% of the latter by analysis and possessing an average molecular weight of about 55,000 was spun from an ethylene carbonate solution as described above. The yarn formed was boiled with an aqueous 10% ethylene diamine solution for thirty minutes, rinsed thoroughly with hot water and subjected to the same dyeing treatment with the Brilliant Croceine 3BA. The yarn accepted the dye only feebly to give a light pastel shade.

*Example II*

To a stirred solution of 1100 grams of water at 60° C. in an atmosphere of nitrogen there was added rapidly 1.3 grams of sodium bisulfite, 3.5 grams of potassium persulfate and a mixture of 190 grams of acrylonitrile and 10 grams of 1-hydroxy-2-chloro-butene-3

$$CH_2=CH-CHCl-CH_2OH$$

The temperature was held at 60–65° C. during the polymerization for three hours, after which an additional quantity of 1 gram of potassium persulfate and 0.5 gram of sodium bisulfite was added to complete the polymerization. The yield of white powdery copolymer was 184 grams. It contained 3.5% by weight of the 1-hydroxy-2-chloro-butene-3 in its polymer structure. (Mol. wt. about 40,000.)

The 1-hydroxy-2-chloro-butene-3 was obtained by reacting butadiene monoxide $$CH_2=CH-CH-CH_2$$
$$\diagdown\diagup$$
$$O$$

with concentrated hydrochloric acid at 25° C. (Petrov, J. Gen. Chem. (U. S. S. R.) 11, 991–5 (1941); Chemical Abstracts, 37, 1699 (1943).)

Yarn (100 denier) spun from a 20% solution of this copolymer in ethylene carbonate by the procedure described in Example I was white, strong and lustrous. Its tenacity was about 3.9 grams per denier and its elongation at break was about 18%.

A skein of this yarn designated (A) was boiled with water for 30 minutes. A similar skein designated (B) was boiled with a 5% aqueous solution of ethylene diamine for 5 minutes. The washed and dried skeins were then each subjected to a solubility test in ethylene carbonate. (A) remained soluble, whereas (B) was completely insoluble.

*Example III*

To a stirred solution of 1350 grams of water and 4.8 grams of sodium formaldehyde sulfoxylate at about 63° C. in an atmosphere of nitrogen, there was added a mixture of 180 grams of acrylonitrile and 20 grams of 1-chloro-2-hydroxy-butene-3, $CH_2=CH-CHOH-CH_2Cl$. Potassium persulfate (5.4 grams in 50 grams of water) was then rapidly added and polymerization continued for 15 minutes after which an additional amount of potassium persulfate (2.7 grams in 100 grams of water) was added to complete the polymerization which required a total time of about three hours. The yield of white powdery copolymer was 164 grams. (Mol. wt. about 30,000.) Its chlorine content was 1.25% corresponding to 3.75% of the chlorohydrin component in the copolymer.

The copolymer was readily soluble in ethylene carbonate or N,N-dimethyl-acetamide at 100° C. to give spinnable 25% solutions. Yarn obtained therefrom by the procedure of Example I was white and strong. Skeins of this yarn were heated at 100° C. for 30 minutes with 10% solutions in ethylene glycol of the following amines: Di-n-propylamine, di-n-butylamine, di-isoamylamine, dicyclohexylamine, benzylamine, piperidine, dodecylamine, diallyl amine and ethylene diamine. The rinsed skeins readily accepted acid dyestuffs in an acidic dye bath as described in Example I.

As previously stated, the proportion of acrylonitrile in the oriented fiber, advantageously, should be at least about 80% by weight and preferably, at least about 90% by weight. A minor proportion (up to a total of about 10% by weight) of one or more other vinyl compounds can be copolymerized with the acrylonitrile and halohydrin monomers if desired, to yield tripolymers or tetrapolymers. Among such other monomers may be mentioned, for example: vinyl esters (vinyl acetate, vinyl formate, vinyl benzoate), vinyl ethers, and vinyl ketones; acrylic acid and its esters and amides; methacrylic acid and its esters, amides, and nitriles; maleic, itaconic, fumaric, crotonic acids and their esters, amides and nitriles; allyl alcohol and its esters and ethers; styrene and nuclear substituted styrenes, e. g. chloro- and dichloro styrene; halogenated monoethylenic compounds such as vinyl chloride, vinyl fluoride, and vinylidene chloride; N-vinyl compounds such as N-vinyl pyrrolidone, N-vinyl succinimide, N-vinyl carbazole; and the like. However, particular advantages are derived when hydrocarbon-substituted vinylpyridines, e. g., 5-ethyl-2-vinylpyridine, or unsubstituted vinylpyridines, e. g., 2-vinylpyridine and 4-vinylpyridine, are employed as an additional monomer. Thus, for example, tripolymers comprising acrylonitrile, a 2- or a 4-vinylpyridine (2 to 10%) and one of the 1,2-halohydrins of the present invention, are particularly receptive to acid dyes, especially when about 2 to 4% of the vinylpyridine is present in the copolymer.

The acrylonitrile-halohydrin copolymers may be prepared by any suitable polymerization method such as, for example, polymerization with oxygen-yielding catalysts, e. g., benzoyl peroxide, hydrogen peroxide, tertiary butyl hydroperoxide, potassium or ammonium persulfate, etc. Redox polymerization systems employing oxygen-yielding catalysts such as the above in combination with reducing agents such as sodium bisulfite, sodium hydrosulfite, etc., may be used with advantage.

The molecular weights of these copolymers are preferably within the range of 10,000 and 250,000, or even higher, although copolymers having molecular weights between 30,000 and 100,000 may be used with particular advantage in the production of fibers.

In the production of fibers from the acrylonitrile-halohydrin copolymers, it is necessary to prepare solutions thereof for extrusion into suitable coagulating media, i. e., evaporative or coagulating atmospheres, liquid coagulating baths, etc. In general, these spinning solutions may be prepared by heating the finely divided copolymers in the presence of a suitable solvent at temperatures between about 50–100° C. or higher depending upon the particular solvent being employed. Typical preferred solvents which may be used are various organic solvents such as N,N-dimethylformamide, or N,N-dimethylacetamide; or the non-nitrogen-containing solvents such as the lactones, e. g. gamma-valerolactone, gamma-butyrolactone, etc., or the cyclic carbonates, e. g. ethylene carbonate, etc. With advantage, particularly in the production of fibers, the heated mixtures of polymer and solvent are maintained in inert or oxygen-free atmospheres to minimize discoloration. These spinning solutions may have a solids content between about 10% and 30% solids depending upon the molecular weight of the polymer, and preferably between about 18% and 25%.

For various purposes it may be desirable to chemically and physically modify these polymer solutions by the presence of other materials such as, for example, pigments, plasticizers, stabilizers, spinning agents, etc.

Among the suitable liquid coagulants which may be employed with advantage with spinning solutions such as ethylene carbonate-type spinning solutions, may be mentioned glycol baths such as triethylene glycol, tetraethylene glycol, dipropylene glycol, and tripropylene glycol. In general, the temperature of the ethylene carbonate-type spinning solutions at extrusion may be maintained between about 80–150° C., and the glycol coagulant at temperatures between about 50–150° C., or if desired, at a higher temperature such as, for example, up to about 175° C.

The freshly extruded and coagulated material thereafter may be washed with an aqueous medium such as water and the washed fibers subsequently stretched up to 600–1000 percent or more. Such stretching may be accomplished in secondary baths containing materials similar to those of the coagulating medium employed, or if desired, other heated media may be employed such as, for example, inert liquids, vapors or gases, e. g., steam.

The washed and stretched products may be heat treated while in a relaxed condition at temperatures between about 100° and 180° C. to improve their physical properties.

I claim:

1. A new acrylonitrile polymer composition of improved dyeability comprising the reaction product of an organic amine having at least one hydrogen atom attached to an amino nitrogen atom and having an ionization constant greater than $4.6 \times 10^{-10}$ at 25° C., with the polymerization product of a mixture comprising acrylonitrile and a 1,2-halohydrin having the formula $$CH_2=\overset{R}{\underset{}{C}}-Y$$

wherein "R" is a member of the group consisting of hydrogen, a methyl radical, chlorine, bromine and iodine; and "Y" is a member of the group consisting of —CH$_2$OH and

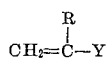

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 99.5% by weight of acrylonitrile and between about 0.5% and 20% by weight of said halohydrin.

2. A new acrylonitrile polymer composition of improved dyeability comprising the reaction product of an organic amine having at least one hydrogen atom attached to an amino nitrogen atom and having an ionization constant greater than $4.6 \times 10^{-10}$ at 25° C., with a copolymer comprising in the polymer molecule randomly repeating units having the formulae (I) $-CH_2-\underset{CN}{\overset{}{CH}}-$ and (II) 

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units.

3. A new acrylonitrile polymer composition of improved dyeability comprising the reaction product of an organic amine selected from the group consisting of primary and secondary polyamines having ionization constants greater than $4.6 \times 10^{-10}$ at 25° C., with a copolymer comprising in the polymer molecule randomly repeating units having the formulae (I) $-CH_2-\underset{CN}{\overset{}{CH}}-$ and (II) 

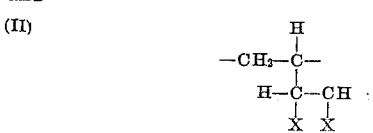

wherein one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units.

4. An oriented fiber comprising the composition of claim 1 and having a molecular weight between about 30,000 and 100,000.

5. An oriented fiber comprising the composition of claim 1 and having a molecular weight between about 30,000 and 100,000.

6. An oriented polymeric acrylonitrile-halohydrin fiber which has been reacted with an organic amine selected from the group consisting of primary and secondary polyamines having ionization constants greater than $4.6 \times 10^{-10}$ at 25° C., said polymeric acrylonitrile-halohydrin fiber being made from a copolymer comprising in the polymer molecule randomly repeating units having the formulae (I) $-CH_2-\underset{CN}{\overset{}{CH}}-$ and (II) 

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units; and having a molecular weight between about 30,000 and 100,000.

7. An oriented polymeric acrylonitrile-halohydrin fiber which has been reacted with an organic amine selected from the group consisting of primary and secondary polyamines having ionization constants greater than $4.6 \times 10^{-10}$ at 25° C., said polymeric acrylonitrile-halohydrin fiber being made from a copolymer comprising in the polymer molecule randomly repeating units having the formulae (I) 

and (II) 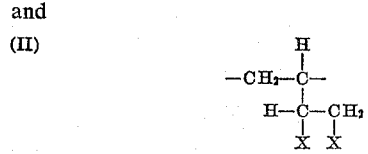

wherein one 'X' is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units; and having a molecular weight between about 30,000 and 100,000.

8. An oriented polymeric amine-containing fiber comprising an acrylonitrile-halohydrin fiber which has been reacted with an organic amine selected from the group consisting of primary and secondary polyamines having ionization constants greater than $4.6 \times 10^{-10}$ at 25° C., said polymeric acrylonitrile amine-containing fiber comprising in the polymer molecule randomly repeating units having the formulae (I) 

and (II) 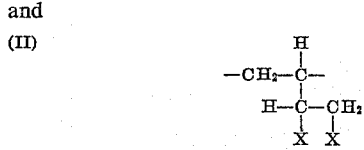

and (III) 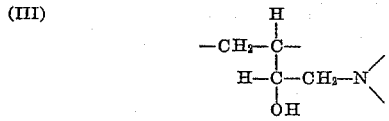

wherein one "X" is a hydroxyl radical and the other "X" is a halogen selected from the group consisting of chlorine, bromine and iodine; "N" is an amino nitrogen atom, the valences thereon being satisfied to form a secondary or tertiary amine; said copolymer containing in the polymer molecule between about 80% and 98% by weight of said (I) units and the total of said (II) units and said (III) units being between about 2% and 20% by weight; and having a molecular weight between about 30,000 and 100,000.

9. An oriented polymeric amine-containing fiber comprising an acrylonitrile-chlorohydrin fiber which has been reacted with an organic amine selected from the group consisting of primary and secondary polyamines having ionization constants greater than $4.6 \times 10^{-10}$ at 25° C., said polymeric acrylonitrile amine-containing fiber comprising in the polymer molecule randomly repeating units having the formulae (I) 

and (II) 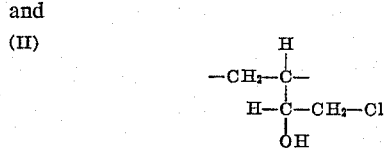

and (III) 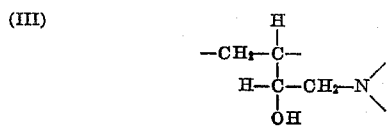

wherein "N" is an amino nitrogen atom, the valences thereon being satisfied to form a secondary or tertiary amine; said copolymer containing in the polymer molecule between about 80% and 98% by weight of said (I) units and the total of said ((II) units and said (III) units being between about 2% and 20% by weight; and having a molecular weight between about 30,000 and 100,000.

10. An oriented polymeric amine-containing fiber comprising an acrylonitrile-chlorohydrin fiber which has been reacted with an organic amine selected from the group consisting of primary and secondary polyamines having ionization constants greater than $4.6 \times 10^{-10}$ at 25° C., said polymeric acrylonitrile amine-containing fiber comprising in the polymer molecule randomly repeating units having the formulae (I) 

and (II) 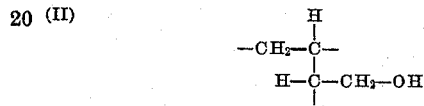

and (III) 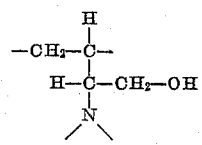

wherein "N" is an amino nitrogen atom, the valences thereon being satisfied to form a secondary or tertiary amine; said copolymer containing in the polymer molecule between about 80% and 98% by weight of said (I) units and the total of said (II) units and said (III) units being between about 2% and 20% by weight; and having a molecular weight between about 30,000 and 100,000.

11. An oriented polymeric amine-containing fiber comprising an acrylonitrile-chlorohydrin fiber which has been reacted with an organic amine selected from the group consisting of primary and secondary polyamines having ionization constants greater than $4.6 \times 10^{-10}$ at 25° C., said polymeric acrylonitrile amine-containing fiber comprising in the polymer molecule randomly repeating units having the formulae (I) 

and (II) 

and (III) 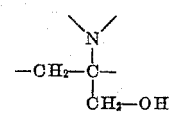

wherein "N" is an amino nitrogen atom, the valences thereon being satisfied to form a secondary or tertiary amine; said copolymer containing in the polymer molecule between about 80% and 98% by weight of said (I) units and the total of said (II) units and said (III) units being between about 2% and 20% by weight; and having a molecular weight between about 30,000 and 100,000.

12. A new acrylonitrile polymer composition of improved dyeability comprising the reaction product of an organic amine having at least one hydrogen atom attached to an amino nitrogen atom and having an ionization constant greater than $4.6 \times 10^{-10}$ at 25° C., with the polymerization product of a mixture comprising acrylonitrile, a vinylpyridine and a 1,2-halohydrin having the formula

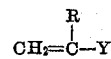

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 97.5% by weight of acrylonitrile, at least about 2% by weight of said vinylpyridine and between about 0.5% and 18% by weight of said halohydrin.

13. A new acrylonitrile polymer composition of improved dyeability comprising the reaction product of an organic amine having at least one hydrogen atom attached to an amino nitrogen atom and having an ionization constant greater than $4.6 \times 10^{-10}$ at 25° C., with the polymerization product of a mixture comprising acrylonitrile, a member of the group consisting of a 2-vinylpyridine and a 4-vinylpyridine, and a 1,2-halohydrin having the formula

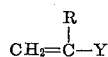

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80 and 97.5% by weight of acrylonitrile, at least about 2% by weight of said vinylpyridine and between about 0.5% and 18% by weight of said halohydrin.

14. An oriented fiber comprising the composition of claim 13 and having a molecular weight between about 30,000 and 100,000.

15. A process which comprises treating an acrylonitrile copolymer with an organic amine having at least one hydrogen atom attached to an amino nitrogen atom and having an ionization constant greater than $4.6 \times 10^{-10}$ at 25° C.; said copolymer comprising the polymerization product of a mixture comprising acrylonitrile and a 1,2-halohydrin having the formula

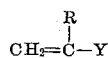

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 99.5% by weight of acrylonitrile and between about 0.5% and 20% by weight of said halohydrin.

16. A process which comprises treating an oriented fiber with an organic amine having at least one hydrogen atom attached to an amino nitrogen atom and having an ionization constant greater than $4.6 \times 10^{-10}$ at 25° C.; said oriented fiber comprising the polymerization product of a mixture comprising acrylonitrile and a 1,2-halohydrin having the formula

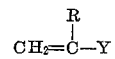

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in hte polymer molecule between about 80% and 99.5% by weight of acrylonitrile and between about 0.5% and 20% by weight of said halohydrin; and having a molecular weight between about 30,000 and 100,000.

17. A process which comprises treating an oriented polymeric acrylonitrile-halohydrin fiber with an organic amine having at least one hydrogen atom attached to an amino nitrogen atom and having an ionization constant greater than $4.6 \times 10^{-10}$ at 25° C., said polymeric acrylonitrile-halohydrin fiber being made from a copolymer comprising in the polymer molecule randomly repeating units having the formulae (I) 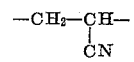

and (II) 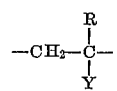

wherein "R" is a member of the group consisting of hydrogen, a methyl radical, chlorine, bromine and iodine; and "Y" is a member of the group consisting of —CH$_2$OH and

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units; and having a molecular weight between about 30,000 and 100,000.

18. A process which comprises treating an oriented polymeric acrylonitrile-halohydrin fiber with an organic amine selected from the group consisting of primary and secondary polyamines having ionization constants greater than $4.6 \times 10^{-10}$ at 25° C., said polymeric acrylonitrile-halohydrin fiber being made from a copolymer comprising in the polymer molecule randomly repeating units having the formulae (I) 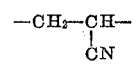

and (II) 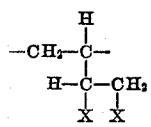

wherein one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units; and having a molecular weight between 30,000 and 100,000.

19. A process which comprises treating an oriented polymeric acrylonitrile-halohydrin fiber with an organic amine having at least one hydrogen atom attached to an amino nitrogen atom and having an ionization constant greater than $4.6 \times 10^{-10}$ at 25° C.; and dyeing said treated fiber with an acid dye; said polymeric acrylonitrile-halohydrin fiber being made from a copolymer comprising in the polymer molecule randomly repeating units having the formulae (I) 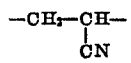

and (II) 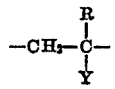

wherein "R" is a member of the group consisting of hydrogen, a methyl radical, chlorine, bromine and iodine; and "Y" is a member of the group consisting of —CH$_2$OH and

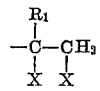

said "R" being one of said halogens when "Y" is —CH$_2$OH; "R$_1$" is a member of the group consisting of hydrogen and a methyl radical; one "X" is a hydroxyl radical and the other "X" is a halogen selected from the group consisting of chlorine, bromine and iodine; said copolymer containing in the polymer molecule between about 80% and 98% by weight of said (I) units and between about 2% and 20% by weight of said (II) units.

20. An oriented fiber having a molecular weight between about 30,000 and 100,000 comprising the copolymer as defined in claim 3 which has been dyed with an acid dye.

21. An oriented fiber having a molecular weight between about 30,000 and 100,000 comprising the copolymer as defined in claim 4 which has been dyed with an acid dye.

References Cited in the file of this patent

UNITED STATES PATENTS

| | | |
|---|---|---|
| 2,626,252 | Tawney | Jan. 20, 1953 |
| 2,656,336 | Ham | Oct. 20, 1953 |